3,759,835
PROCESS FOR PRODUCING RARE EARTH
OXIDE PHOSPHORS
Emil J. Mehalchick, Towanda, Pa., assignor to
GTE Sylvania Incorporated
No Drawing. Filed Mar. 22, 1971, Ser. No. 126,957
Int. Cl. C09k 1/10
U.S. Cl. 252—301.4 R         11 Claims

ABSTRACT OF THE DISCLOSURE

A process for producing rare-earth oxide phosphors is disclosed wherein specified amounts of yttrium oxide, gadolinium, or mixtures thereof are blended with europium oxide and a heat decomposable borate source and heated to a certain temperature for a predetermined length of time. The material is then reblended with a specified amount of a heat decomposable lithium source and heated to a certain temperature for a predetermined length of time.

BACKGROUND OF THE INVENTION

Field of the invention

This invention relates to a process for producing rare-earth oxide phosphors. More specifically, it relates to a direct heating process for producing rare-earth oxide phosphors.

Prior art

Rare-earth oxide phosphors are generally produced by dissolving the deaired rare-earth oxides, such as yttrium oxide, gadolinium oxide, or a mixture of both, with the activator material, generally europium oxide, in acid, such as nitric acid or hydrochloric acid. The rare-earth values are then coprecipitated as the oxalate using oxalic acid. The oxalates are washed, dried and heated to about 900° C. for about one hour, cooled, blended and reheated for about two hours at about 1175° C.

The process works very well, especially when raw materials of less than about 99.99% purity are used, since the precipitation step results in some purification. However, the chemical treatment does require several processing steps. This, together with the need for the addition of acids to the oxides adds to the expense of preparing phosphors from already very expensive starting materials.

When pure starting materials, that is at least about 99.99% are used, further purification is generally not necessary. It is believed, therefore, that a process that produces rare-earth phosphors of equal quality without any chemical processing steps or the addition of reagents, but rather by a direct heating method is an advancement in the art.

SUMMARY OF THE INVENTION

In accordance with one aspect of this invention, there is provided a process for producing rare-earth oxide phosphors. The process comprises forming a relatively uniform first admixture consisting essentially of a matrix source selected from the group consisting of yttrium oxide, gadolinium oxide, and mixtures having at least about 99.99% purity, and, as an activator source, europium oxide in molar ratios of activator source to matrix source of from about 1:99 to about 10:90 and as a dopant from about 0.1 wt. percent to about 10.0 wt. percent based on the total weight of said first admixture, of a heat decomposable borate furnishing compound. The first admixture is preheated at a temperature from about 900° C. to about 1150° C. for at least about 30 minutes and then cooled to a temperature of at least about 25° C. before adding to the resulted cooled material, a dopant consisting essentially of from about .2 wt. percent to about 5.0 wt. percent of a heat decomposable lithium source, and forming a substantially uniform second admixture. This second admixture is then heated for at least about 1 hour at a temperature of greater than about 1150° C. to form a europium-activated rare-earth oxide phosphor.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of one of the aspects of the invention.

Surprisingly, it has been found that rare-earth oxide phosphors can be prepared by combining the raw materials in a definite weight ratio with suitable dopants and directly heating the material to form the desired phosphor.

Referring now to the invention with greater particularity, for example from about .90 mol to about .99 mol of a matrix source selected from yttrium oxide, gadolinium oxide, and mixtures thereof, an activator source of about .01 mol to about .10 mol of europium oxide and a dopant consisting essentially of about .1 wt. percent to about 10.0 wt. percent of the total admixture of a heat decomposable borate furnishing compound are blended and then preheated for at least about 30 minutes at a temperature of about 900° C. to about 1150° C. Care must be taken that the purity of the starting materials is at least about 99.99% pure to insure a pure phosphor with sufficient brightness. Especially preferred are materials of about 99.999% purity. Although about .90 mol to about .99 mol of a matrix source can be used and about .01 mol to about .10 mol activator source can be used, it is especially preferred to use about .95 mol to about .96 mol matrix source, i.e., yttrium oxide, gadolinium oxide and mixtures thereof, and about .04 mol to about .055 mol of europium oxide to insure the maximum color purity and brightness. When less than about .945 mol matrix source is used, the excessive amounts of activator material, i.e., europium, present can cause a quenching effect and a significant loss in brightness. When greater than about .99 mol matrix source is used, generally not enough europium is present to activate the phosphor. From about .10 wt. percent to about 10.0 wt. percent of a heat decomposable borate furnishing compound can be used, but about 1.0 wt. percent is especially preferred. By heat decomposable borate furnishing compound is meant any compound that will decompose when heated to a temperature of greater than about 1150° C. to yield a borate ion. Examples of such compounds are boric acid, boron oxide, sodium borate and $(NH_4)_3BO_3$. Of these, boric acid is especially preferred. Some fluxing action is obtained by preheating the blended materials for at least about 30 minutes at a temperature of about 900° C. to about 1150° C. Care must be taken to avoid temperatures greater than about 1150° C., so as not to decompose the borate-ion-furnishing compound. Likewise, the lower temperature of at least about 900° C. is necessary to obtain a mild fluxing action. Although heating the material for longer than about 2 hours has no apparent deleterious effect on the phosphor or its brightness, it is generally avoided for economic reasons.

After preheating the blended admixture, it is allowed to cool to at least about 25° C. so it can be safely handled. A second admixture is formed by blending from about .10 wt. percent to about 10.0 wt. percent of a heat decomposable lithium furnishing compound, as a dopant, and then heating the reblended admixture for at least about 1 hour at a temperature of above about 1150° C. by heat decomposable lithium furnishing compound is meant any compound that will decompose when heated to a temperature of greater than about 1150° C. to yield a lithium ion. Examples of such compounds are lithium carbonate, lithium acetate, lithium citrate, lithium chloride and lithium nitrate and the like. Especially preferred is about 1.0 wt. percent lithium carbonate.

The second admixture is heated to temperatures greater than about 1150° C. for about 1 to about 4 hours to decompose both the borate-ion-furnishing compound and the lithium-ion-furnishing compound so that lithium borate, a fluxing agent, can be formed. The fluxing agent gives the phosphor prepared by this invention a brightness equal to a similar phosphor prepared by the aforementioned standard process, by helping to incorporate the activator source, europium, into the lattice. Temperatures of about 1150° C. to about 1250° C. are generally sufficient to decompose the dopants, with temperatures of about 1200° C. to about 1235° C. for about 2 hours being especially preferred. Below about 1150° C. the dopants generally do not decompose and little fluxing action is obtained, resulting in a phosphor of decreased brightness. Temperatures above about 1250° C. are generally avoided as both unnecessary and uneconomical. Heating times of about 1 to about 4 hours at these temperature ranges have been found sufficient to obtain the desired fluxing action of the dopant.

To more fully illustrate the invention, the following detailed examples are given. All parts, proportions, and percentages are by weight unless otherwise given.

EXAMPLE 1

About 454 parts yttrium oxide, about 33.2 parts europium oxide, and about 4.2 parts boric acid are blended for about 30 minutes. The blended material is heated for about 1 hour at a temperature of about 1100° C. After heating, the material is cooled to about 25° C. and about 3.9 parts lithium carbonate is added and the material is reblended for about 30 minutes. The material is then heated for about 3 hours at a temperature of about 1200° C. The product obtained is a very efficient red-emitting cathode-ray phosphor equivalent in brightness and color to a red-emitting cathode-ray phosphor prepared by the standard procedure.

EXAMPLE 2

About 227 parts yttrium oxide, about 227 parts gadolinium oxide, about 33.2 parts europium oxide, and about 4.2 parts boric acid are blended for about 30 minutes. The blended material is heated for about 2 hours at a temperature of about 950° C. After heating, the material is cooled to about 25° C. and about 3.9 parts lithium carbonate is added and the material is reblended for about 30 minutes. The material is then heated for about 4 hours at a temperature of about 1200° C. The product obtained is a very efficient red-emitting cathode-ray phosphor equivalent in brightness and color to a red-emitting cathode-ray phosphor prepared by the standard procedure.

EXAMPLE 3

About 454 parts gadolinium oxide, about 33.2 parts europium oxide and about 4.2 parts boric acid are blended for about 30 minutes. The blended material is treated as in Example 1 with substantially the same results.

While there have been shown and described what are at the present considered the preferred embodiments of the invention, it will be obvious to those skilled in the art that various changes and modifications may be made therein without departing from the scope of the invention as defined by the appended claims.

What is claimed is:
1. A process for producing rare-earth oxide phosphors which comprises:
 (a) forming a first relatively uniform admixture consisting essentially of a matrix source selected from the group consisting of yttrium oxide, gadolinium oxide, and mixtures thereof, of at least about 99.99% purity and, as activator source, europium oxide in molar ratios of activator source to matrix source of from 1:99 to 10:90 and from about 0.1 to about 10 wt. percent, based on the weight of said first admixture, of a heat decomposable borate furnishing compound,
 (b) heating said first admixture for at least about 30 minutes at a temperature of about 900° C. to about 1150° C.,
 (c) cooling said first admixture to at least about 25° C.,
 (d) adding to the resulting cooled admixture a dopant consisting essentially of from about 0.2 to about 5.0 wt. percent based on the weight of said cooled admixture of a heat-decomposable lithium source, to form a second substantially uniform admixture, and
 (e) heating said second admixture for at least about 1 hour at a temperature of greater than about 1150° C. to form a europium-activated rare-earth oxide phosphor.
2. A process according to claim 1, wherein said heat-decomposable borate furnishing compound is selected the group consisting of boric acid, boron oxide and ammonium borate.
3. A process according to claim 2, wherein said heat-decomposable borate furnishing compound is boric acid.
4. A process according to claim 3, wherein said heat-decomposable borate furnishing compound is boron oxide.
5. A process according to claim 1, wherein said heat-decomposable lithium source is selected from the group consisting of lithium carbonate, lithium acetate, lithium citrate, lithium chloride and lithium nitrate.
6. A process according to claim 5, wherein said heat-decomposable source is lithium carbonate.
7. A process according to claim 6, wherein said heat-decomposable source is lithium acetate.
8. A process according to claim 1, wherein said first admixture is heated for about 30 minutes to about 2 hours.
9. A process according to claim 1, wherein said second admixture is heated for about 1 to about 4 hours.
10. A process according to claim 9 wherein said temperature during the heating of said second admixture is from about 1150° C. to about 1250° C.
11. A process according to claim 10 wherein said temperature during the heating of said second admixture is from about 1200° C. to about 1235° C.

References Cited
UNITED STATES PATENTS

| | | | |
|---|---|---|---|
| 3,457,184 | 7/1969 | Kobayashi et al. | 252—301.4 R |
| 3,458,450 | 7/1969 | Kobayashi et al. | 252—301.4 R |
| 3,458,451 | 7/1969 | Kobayashi et al. | 252—301.4 R |
| 3,562,175 | 2/1971 | Hickok | 252—301.4 R |

OSCAR R. VERTIZ, Primary Examiner

J. COOPER, Assistant Examiner

PO-1050
(5/69)

UNITED STATES PATENT OFFICE
CERTIFICATE OF CORRECTION

Patent No. 3,759,835      Dated September 18, 1973

Inventor(s) Emil J. Mehalchick

It is certified that error appears in the above-identified patent and that said Letters Patent are hereby corrected as shown below:

Col. 4, line 33 (Claim 2)  after "selected" insert "from"

Signed and sealed this 18th day of December 1973.

(SEAL)
Attest:

EDWARD M. FLETCHER, JR.                RENE D. TEGTMEYER
Attesting Officer                      Acting Commissioner of Patents